United States Patent
Yada et al.

(10) Patent No.: US 7,413,615 B2
(45) Date of Patent: Aug. 19, 2008

(54) METHOD OF TRANSFERRING POLYMERIZABLE LIQUID AND APPARATUS FOR TRANSFER

(75) Inventors: Shuhei Yada, Mie (JP); Masayasu Goriki, Mie (JP); Yoshihiro Shimizu, Mie (JP)

(73) Assignee: Mitsubishi Chemical Corporation, Tokyo (JP)

(*) Notice: Subject to any disclaimer, the term of this patent is extended or adjusted under 35 U.S.C. 154(b) by 769 days.

(21) Appl. No.: 10/849,166

(22) Filed: May 20, 2004

(65) Prior Publication Data

US 2004/0212154 A1   Oct. 28, 2004

Related U.S. Application Data

(63) Continuation of application No. PCT/JP02/11733, filed on Nov. 11, 2002.

(30) Foreign Application Priority Data

Nov. 22, 2001  (JP) ............................. 2001-357917

(51) Int. Cl.
*B08B 7/00* (2006.01)
*F01D 11/00* (2006.01)

(52) U.S. Cl. .................. 134/10; 134/22.1; 415/111; 417/53

(58) Field of Classification Search ............. 134/22.1, 134/42, 10; 417/53, 111, 429, 432, 433; 415/51.1, 55.1, 58.2, 58.4, 111, 112
See application file for complete search history.

(56) References Cited

U.S. PATENT DOCUMENTS 4,990,068 A * 2/1991 Zhong et al. ............. 417/423.8
6,454,541 B1 * 9/2002 Ijiri et al. .................... 417/53

FOREIGN PATENT DOCUMENTS

| JP | 57-184765 | 11/1982 |
| JP | 60-230600 | 11/1985 |
| JP | 1-142291 | 6/1989 |
| JP | 3-38462 | 4/1991 |
| JP | 4-93795 | 8/1992 |
| JP | 08-075012 | * 3/1996 |
| JP | 8-75012 | 3/1996 |
| JP | 8-99031 | 4/1996 |

* cited by examiner

*Primary Examiner*—Michael Barr
*Assistant Examiner*—Saeed T Chaudhry
(74) *Attorney, Agent, or Firm*—Oblon, Spivak, McClelland, Maier & Neustadt, P.C.

(57) ABSTRACT

A subject for the invention is to provide a method of transferring a polymerizable liquid by which the polymerizable liquid can be stably transferred without arousing any mechanical-seal trouble over long. The method of transferring a polymerizable liquid utilizes a pump which has a mechanical seal having seal faces and has a flushing liquid line for supplying a flushing liquid to a flushing liquid introduction opening of the mechanical seal, wherein the flushing liquid line is equipped with a strainer, a device for adding a polymerization inhibitor, or a flushing liquid cooler.

11 Claims, 1 Drawing Sheet

METHOD OF TRANSFERRING POLYMERIZABLE LIQUID AND APPARATUS FOR TRANSFER

CROSS REFERENCE TO RELATED APPLICATION

This is a Continuation Application of PCT Application No. PCT/JP02/11733, filed on Nov. 11, 2002, which was not published under PCT Article 21(2) in English. This application is based upon and claims the benefit of priority from the prior Japanese Patent Application No. 2001-357917, filed Nov. 22, 2001, the entire contents of which are incorporated herein by reference.

TECHNICAL FIELD

The present invention relates to a method and apparatus for transferring a polymerizable liquid such as acrylic acid or methacrylic acid. More particularly, the invention relates to a method and apparatus for transferring a polymerizable liquid with a pump device having a mechanical seal.

BACKGROUND ART

Polymerizable liquids are known to polymerize by the action of heat or light or due to another factor during a production step, storage, or transportation to often create problems. The addition of a polymerization inhibitor such as phenothiazine or a phenol compound, e.g., hydroquinone and derivatives thereof, and contact with an oxygen-containing gas are known to be effective methods for preventing the occurrence of such problems, i.e., for preventing the polymerization of polymerizable compounds. These are techniques in extensive use.

There are cases where a mechanical seal is used as the seal in a pump for liquid transfer.

A mechanical seal comprises a driven ring capable of moving in the axial direction with the wear of the sealing terminal and a sheet ring which does not move. The contact surfaces have been well ground so that a fluid is sealed by the sealing end faces which are perpendicular to the axis and rotate relatively to each other.

A contact pressure is given by the pressure of the fluid to be sealed, a spring, or the pressure of another fluid, or by a rubber, bellows, magnetic force, etc.

There are many kinds of mechanical seals. Although single-mechanical seals are generally used frequently, double-mechanical seals are frequently used for handling fluids such as high-viscosity liquids, high-temperature or low-temperature liquids, and slurries. The mechanical seals are classified by a combination of basic functions as an unbalance type, balance type, rotational type, stationary type, inward flow type, outward flow type, back-end-face high-pressure type, back-end-face low-pressure type, inside-spring type, outside-spring type, etc. Static surface-pressing mechanisms which apply a pressure to the ground surfaces include a coil spring, magnetic force, rubber, metal-welded bellows, and the like.

Mechanical seals employ flushing, quenching, cooling, and other mechanisms for the purposes of cooling and lubrication and preventing foreign particles from accumulating. The flushing mechanism is a mechanism for injecting a liquid (flushing liquid) into the sliding part of a shaft seal part. With this flushing liquid, the mechanical seal is cooled to a temperature in a suitable range. This flushing liquid further functions not only to prevent the high-pressure-side fluid from vaporizing at the sealing end faces to improve lubrication but also to prevent impurities from accumulating in the shaft seal part.

Flushing techniques include self-flushing, in which the liquid itself being transferred is used for flushing, and external flushing, in which a liquid other than the liquid being transferred is injected.

The quenching mechanism is a mechanism for passing a cooling fluid through a non-sliding part of the shaft seal part. The primary purpose of this quenching mechanism is to keep the temperature of the sealing end faces in a suitable range. However, in the case where a volatile fluid, a fluid which is apt to form crystals, a harmful fluid, or the like is handled, the quenching mechanism is frequently used for the purpose of washing off the fluid which has leaked out. Examples of the quenching mechanism include ones employing a seal cover having an auxiliary bushing and ones employing a seal cover having an auxiliary gland.

The cooling mechanism is a mechanism by which a fluid is injected into and discharged from a part other than the sealing end faces in the mechanical seal, and is intended to keep the temperature around the mechanical seal in a suitable range. It is frequently used for cooling mechanical seals which handle high-temperature fluids.

In the mechanical seal part of a pump which transfers a polymerizable liquid, a leakage occurs frequently because the pump contents themselves (e.g., polymerizable liquid) or sludge or a polymer contained in the contents tenaciously adheres to the sliding part (sealing part) or another part or because the contents polymerize due to the heat generated in the mechanical seal part and the resultant polymer tenaciously adheres to the sliding part.

There is a seal utilizing a bellows-shape spring film member or the like (bellows seal) as a seal for preventing a sludge or the like from tenaciously adhering to the sliding part. However, this seal also suffers a leakage in the case of a fluid which polymerizes through a polymerization reaction, because a polymer generates and tenaciously adheres to the sealing surfaces and bellows part to reduce the function of pushing against the sliding part or cause a working failure, and further suffers a leakage due to the breakage caused by the concentration of the rotating force of the pump shaft on the bellows.

A maintenance operation has hence being conducted hitherto in which water, warm water, steam, or nitrogen gas is used to flush or quench the atmospheric side of the sealing surfaces (to conduct insulation from the air, such as cooling, heat insulation, and cleaning). In the case where the liquid to be transferred has a high temperature, a technique is being employed in which a device for cooling the periphery of the sealing region is separately disposed.

Flushing and quenching are effective in preventing adhesion to the sealing surfaces and sliding part of a mechanical seal. However, in the case where the fluid in the pump is one for which water inclusion is not allowable or one which reacts with water or with air contained in water, flushing or quenching cannot prevent the generation of a sludge or polymer although effective in washing off the sludge or polymer which has generated.

Namely, the sealing surfaces of a mechanical seal are lubricated by the formation of a thin film of an enclosed fluid in the space between the contact surfaces of the stationary-side seal face member fixed to the pump main body and the rotational-side seal face member disposed on the rotating shaft, and the enclosed fluid is inhibited from leaking out by the surface tension of the thin film. Since the flushing liquid and the air are in the state of being mixed and contacted with each other at the boundary between these, polymerizable ones undergo a polymerization reaction.

SUMMARY OF THE INVENTION

An object of the present invention is to inhibit polymerization in a mechanical seal so as to enable the prevention of a working failure over a long period of time.

The method of transferring a polymerizable liquid of the present invention is a method of transferring a polymerizable liquid with a pump having a mechanical seal and having a flushing liquid line for supplying a flushing liquid to the mechanical seal, characterized in that the flushing liquid line is equipped with a strainer, a device for adding a polymerization inhibitor, or a flushing liquid cooler.

Furthermore, the apparatus for transferring a polymerizable liquid of the invention is an apparatus for transferring a polymerizable liquid with a pump having a mechanical seal and having a flushing liquid line for supplying a flushing liquid to the mechanical seal, characterized in that the flushing liquid line is equipped with a strainer, a device for adding a polymerization inhibitor, or a flushing liquid cooler.

According to the invention, by disposing a strainer, a device for adding a polymerization inhibitor, or a flushing liquid cooler in or for the flushing liquid line of the mechanical seal, the polymerizable liquid is inhibited from polymerizing in the mechanical seal and a pump working failure is prevented.

DESCRIPTION OF THE PREFERRED EMBODIMENTS

Figure 1:
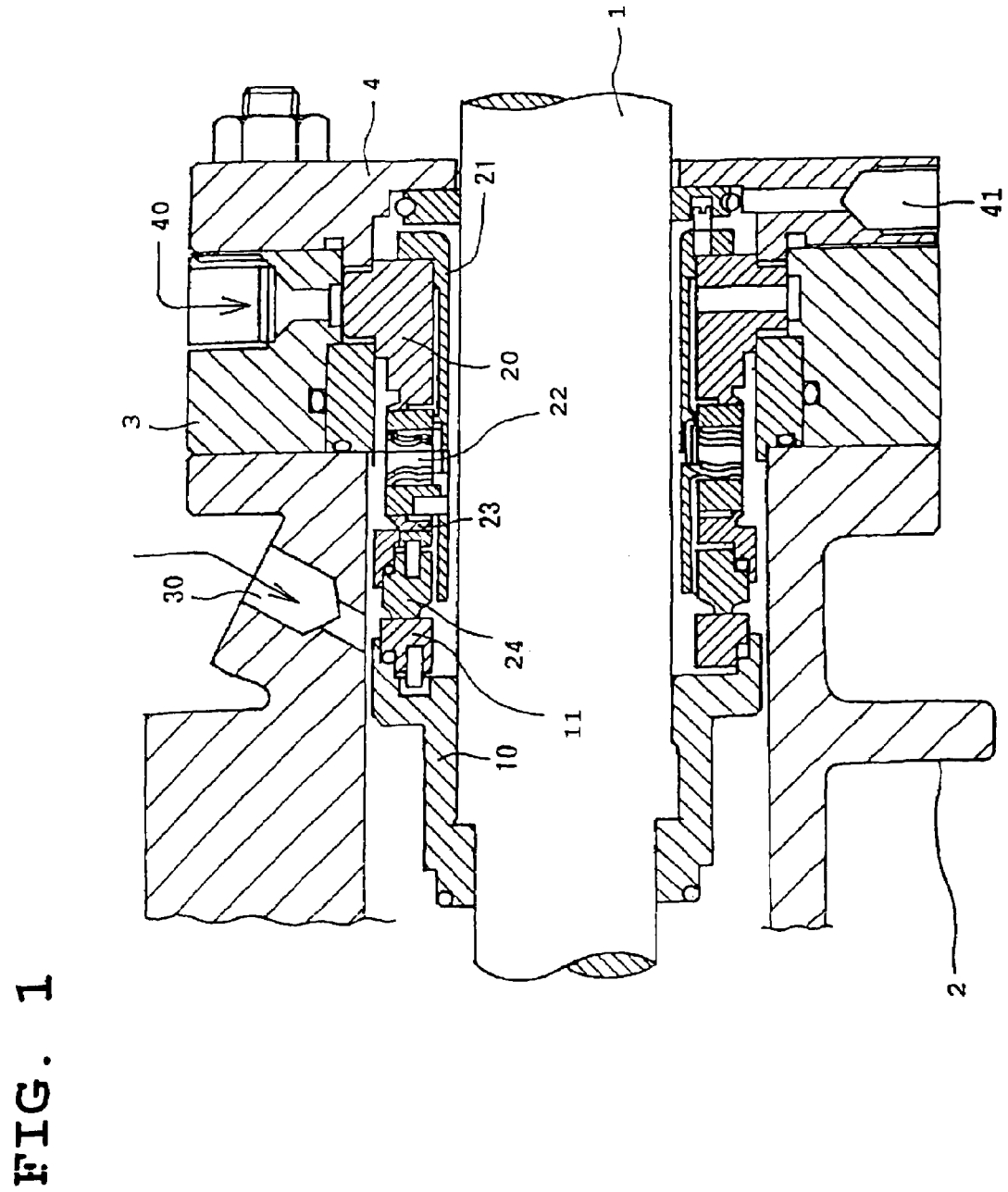
FIG. 1 is a sectional view showing an example of the structures of mechanical seals.

In the FIGURE is shown a rotating shaft 1, a rotation-side seal face 11, a retainer 20, a bellows 22, a stationary-side seal face 24, a flushing liquid introduction opening 30, a steam quench inlet 40, and a quench drain outlet 41.

The method of transfer of the invention is intended to be applied to the transfer of a readily polymerizable liquid. It is especially suitable for use in the case where a liquid containing (meth)acrylic acid, a (meth)acrylic ester, a styrene monomer, acrylonitrile, or the like is transferred with a pump of the mechanical seal type in a production step, in storage facilities, etc. Examples of the acrylic ester include methyl acrylate, ethyl acrylate, butyl acrylate, isobutyl acrylate, tert-butyl acrylate, 2-ethylhexyl acrylate, 2-hydroxyethyl acrylate, 2-hydroxypropyl acrylate, methoxyethyl acrylate, and the like. Examples of the methacrylic ester include methyl methacrylate, butyl methacrylate, isobutyl methacrylate, tert-butyl methacrylate, 2-hydroxyethyl methacrylate, and the like.

In the invention, this polymerizable liquid is transferred with a pump having a mechanical seal, and polymerization in the mechanical seal is prevented by disposing a strainer, a device for adding a polymerization inhibitor, or a flushing liquid cooler in or for the flushing liquid line of the mechanical seal.

As stated above in Background Art, there are various kinds of mechanical seals including the unbalance type, balance type, rotational type, stationary type, inward flow type, outward flow type, back-end-face high-pressure type, back-end-face low-pressure type, inside-spring type, and outside-spring type. With respect to springs also, there are various types. In the invention, a mechanical seal of any type may be used.

Furthermore, such a mechanical seal is not limited not only in structure, balance type, etc., but also in the material of the sliding surfaces and the material constituting the seal. The flushing liquid also is not particularly limited in kind, etc.

The flushing liquid to be used for the mechanical seal part is one which does not influence the polymerizable liquid to be transferred even when it comes into the polymerizable liquid.

This flushing liquid is not always clean, and there are cases where impurities, e.g., a polymer, are present in the liquid. Such impurities may adhere to the sliding part of the packing to cause a driven-ring working failure, leading to a leakage. In such a case, a strainer is disposed in the flushing liquid line to remove solid impurities. Although only one strainer may be disposed, strainers may be arranged in two or more stages. With respect to the mesh size of the strainer, it is preferably in the range of from 20 mesh to 200 mesh and especially preferably from 30 to 100 mesh. It is desirable that a manometer be attached before and after the strainer to detect strainer clogging. When the strainer is coarser than 20 mesh, there are cases where solids are not sufficiently removed. On the other hand, when the strainer is finer than 200 mesh, the strainer brings about an increased pressure loss, resulting in an increased power required for transfer. Such a fine strainer is hence economically undesirable.

A device for adding a polymerization inhibitor may be disposed for the flushing liquid line. Examples of the polymerization inhibitor include phenol compounds such as hydroquinone, methoquinone (methoxyhydroquinone), pyrogallol, catechol, and resorcinol; N-oxyl compounds such as tert-butyl nitroxide, 2,2,6,6-tetramethyl-4-hydroxypiperidyl-1-oxyl, 2,2,6,6-tetramethylpiperidyl-1-oxyl, 2,2,6,6-tetramethylpiperidinooxyl, 4-hydroxy-2,2,6,6-tetramethylpiperidinooxyl, and 4,4',4"-tris(2,2,6,6-tetramethylpiperidinooxyl) phosphite; phenothiazine compounds such as phenothiazine, bis($\alpha$-methylbenzyl)phenothiazine, 3,7-dioctylphenothiazine, and bis($\alpha,\alpha'$-dimethylbenzyl)phenothiazine; copper compounds such as cupric chloride, copper acetate, copper carbonate, copper acrylate, copper dimethyldithiocarbamate, copper diethyldithiocarbamate, copper dibutyldithiocarbamate, and copper salicylate; manganese salt compounds such as manganese acetate; phenylenediamines such as p-phenylenediamine; nitroso compounds such as N-nitrosodiphenylamine; urea compounds such as urea; and thiourea compounds such as thiourea. These compounds can be used either alone or in combination of two or more thereof.

The polymerization inhibitor may be added in the form of a solution in an appropriate solvent. Examples of the solvent for, e.g., hydroquinone or methoquinone include water, acetic acid, (meth)acrylic acid, (meth)acrylic esters, aromatic compounds, ketones, alcohols, mixtures of one or more of these, and the like.

The solvent preferably is one which is used in the process where the polymerizable liquid to be transferred is handled and which exerts no influence even when it comes into the product. Incidentally, a solvent which is not used in the process may also be employed as long as it does not cause a trouble to the process and exerts no influence even when it comes into the product.

The disposition of the device for adding a polymerization inhibitor for the flushing liquid line is preferred when the flushing liquid to be used is the same polymerizable liquid as the polymerizable liquid to be transferred. In the case where a polymerizable liquid is used as the flushing liquid, the amount of the polymerization inhibitor to be added is preferably about from 0.1 to 3 times the concentration of the polymerization inhibitor in the polymerizable liquid to be transferred.

The disposition of a flushing liquid cooler for the flushing liquid line is preferred especially when the flushing liquid is a polymerizable liquid. This is intended to prevent the polymerizable liquid as the flushing liquid from heating up to polymerize due to the heat of sliding of the mechanical seal. It is desirable that this cooler be used to cool the flushing liquid to 100° C. or lower, especially to 25 to 50° C.

In the invention, a steam quenching mechanism may be disposed for the mechanical seal in the case where the polymerizable liquid to be transferred has a high temperature.

EXAMPLES

Examples and Comparative Examples will be explained below.

Example 1

The mechanical-seal pump of the external flushing type shown in FIG. 1 was used as a pump for discharging bottoms from a column containing a large amount of acrylic acid heavy ends. As an external flushing liquid, the feed liquid for the column was used. 100-Mesh strainers were disposed in parallel in the flushing line, and a manometer was disposed on the upstream side and downstream side of the strainers so that the line could be switched when the pressure difference in the strainer part had increased. Steam quenching was also conducted.

As a result, the liquid could be transferred over a 1 year period without causing any problems.

The mechanical seal as shown in FIG. 1 is explained below.

The rotating shaft 1 has been disposed so as to penetrate a casing 2, a seal cover 3, and an end cover 4. A rotation-side seal face 11 has been attached to the rotating shaft 1 through a rotation-side sleeve 10. A bellows 22 and a face holder 23 have been disposed through a retainer 20 and a stationary-side sleeve 21 which are supported by the seal cover 3. A stationary-side seal face 24 has been attached to the face holder 23. The seal face 24 is pushed by the bellows 22 against the seal face 11, whereby the seal faces 11 and 24 are slidable on each other. A flushing liquid line is connected to a flushing liquid introduction opening 30 formed in the casing 2, and a flushing liquid is supplied through the introduction opening 30. The seal cover 3 has a steam quench inlet 40, while the end cover 4 has a quench drain outlet 41.

Example 2

A mechanical-seal pump of the self-flushing type was used as a pump for discharging a distillate from a column containing a large amount of acrylic acid. The pump was operated while adding a polymerization inhibitor (hydroquinone) to the flushing liquid in an amount corresponding to 100 ppm. As a result, the liquid could be transferred over 1 year without causing any problems.

Comparative Example 1

The pump in Example 2 was operated without adding a polymerization inhibitor to the flushing liquid. As a result, a leakage occurred after 3 months due to polymerization in the mechanical seal part. The operation was hence stopped.

Example 3

A mechanical-seal pump of the self-flushing type (liquid temperature: 70° C.) was used as a pump for discharging bottoms from an acrylic acid purification column. A heat exchanger for cooling was disposed for the flushing liquid line. The pump was operated while reducing the liquid temperature to 25 to 30° C. As a result, the liquid could be transferred over 1 year without causing any problems.

Comparative Example 2

The pump in Example 3 was operated without cooling the flushing liquid. As a result, a leakage occurred in the third month due to polymerization in the mechanical seal part. The operation was hence stopped.

Example 4

Mechanical-seal pumps were used as pumps for discharging bottoms containing a large amount of acrylic acid. Crude acrylic acid was used as a flushing liquid (liquid temperature: 20° C.) for external flushing. A 60-mesh strainer was disposed in the main line for the flushing liquid, and each pump was operated with external flushing. As a result, the pumps suffered no problems, and the liquid could be transferred over 1 year without causing any problems.

Comparative Example 3

The pumps in Example 4 were operated with a flushing liquid for self-flushing. As a result, a leakage occurred in 2 to 3 months due to polymerization in the mechanical seal part. The operation was hence stopped.

While the invention has been described in detail and with reference to specific embodiments thereof, it will be apparent to one skilled in the art that various changes and modifications can be made therein without departing from the spirit and scope thereof.

INDUSTRIAL APPLICABILITY

As described above, according to the invention, a polymerizable liquid can be stably transferred without causing any problems in the mechanical seal over a long period of time.

The invention claimed is:

1. A method of transferring a polymerizable liquid with a pump having a rotatable horizontal shaft and a mechanical seal, which comprises:
    providing a flushing liquid line for supplying a flushing liquid to the mechanical seal, the flushing liquid line comprising a strainer, a device for adding a polymerization inhibitor, or a flushing liquid cooler, and
    forming said mechanical seal by spacing a stationary seal and a rotary seal so as to engage one another and so as to be spaced from said horizontal shaft.

2. The method of transferring a polymerizable liquid as claimed in claim 1, wherein the flushing liquid cooler is a heat exchanger.

3. The method of transferring a polymerizable liquid as claimed in claim 1 or 2, wherein the polymerizable liquid is a compound containing an ethylenic double bond.

4. The method of transferring a polymerizable liquid as claimed in claim 3, wherein the compound containing an ethylenic double bond is (meth)acrylic acid or an ester thereof, styrene, or acrylonitrile.

5. The method of transferring a polymerizable liquid as claimed in claim 1, wherein the strainer is a 20- to 200-mesh strainer.

6. The method of transferring a polymerizable liquid as claimed in claim 1, wherein the polymerization inhibitor is at least one member selected from phenol compounds, N-oxyl compounds, phenothiazine compounds, and copper compounds.

7. The method of transferring a polymerizable liquid as claimed in claim 1, wherein the flushing liquid to be supplied to the mechanical seal has a temperature of 100° C. or lower.

8. The method of transferring a polymerizable liquid as claimed in claim 1, wherein the flushing liquid is a polymerizable liquid of the same kind as the polymerizable liquid to be transferred.

9. The method of transferring a polymerizable liquid as claimed in claim 1, which comprises mounting said shaft and said rotary seal on a slide sleeve.

10. An apparatus for transferring a polymerizable liquid, which comprises:

a pump having a rotatable horizontal shaft, a mechanical seal and a flushing liquid line for supplying a flushing liquid to the mechanical seal, wherein the flushing liquid line is equipped with a strainer, a device for adding a polymerization inhibitor, or a flushing liquid cooler and wherein said mechanical seal comprises a stationary seal and a rotary seal and which engages with said stationary seal, each said rotary seal and stationary seal being spaced from said horizontal shaft.

11. An apparatus as claimed in claim 10, which comprises a slide sleeve on which is mounted said shaft and said rotary seal.

* * * * *